United States Patent
Riddle et al.

(10) Patent No.: US 12,555,905 B2
(45) Date of Patent: Feb. 17, 2026

(54) METHODS AND APPARATUS FOR DYNAMIC ANTENNA TILT COORDINATION

(71) Applicant: AirHop Communications, Inc., San Diego, CA (US)

(72) Inventors: Christopher Riddle, San Diego, CA (US); Bijan Golkar, San Diego, CA (US)

(73) Assignee: AirHop Communications, Inc., San Diego, CA (US)

( * ) Notice: Subject to any disclaimer, the term of this patent is extended or adjusted under 35 U.S.C. 154(b) by 753 days.

(21) Appl. No.: 17/810,896

(22) Filed: Jul. 6, 2022

(65) Prior Publication Data

US 2024/0014551 A1 Jan. 11, 2024

(51) Int. Cl.
*H04W 24/10* (2009.01)
*H01Q 3/34* (2006.01)
*H04B 17/12* (2015.01)
*H04B 17/21* (2015.01)

(52) U.S. Cl.
CPC ............. *H01Q 3/34* (2013.01); *H04B 17/12* (2015.01); *H04B 17/21* (2015.01); *H04W 24/10* (2013.01)

(58) Field of Classification Search
CPC ........ H04B 17/12; H04B 17/21; H01Q 1/246; H01Q 3/2605; G06N 20/00; G06N 5/02
See application file for complete search history.

(56) References Cited

U.S. PATENT DOCUMENTS

| | | | | |
|---|---|---|---|---|
| 10,034,181 | B1 * | 7/2018 | Somashekar | H04W 16/28 |
| 2010/0317292 | A1 * | 12/2010 | Takatani | H04W 72/542 |
| | | | | 455/63.1 |
| 2020/0364187 | A1 * | 11/2020 | Tran | G06N 3/02 |
| 2023/0209383 | A1 * | 6/2023 | Reeves | H04W 24/10 |
| | | | | 455/423 |

FOREIGN PATENT DOCUMENTS

| | | | | |
|---|---|---|---|---|
| WO | WO-2020064134 A1 * | 4/2020 | | H04B 17/15 |
| WO | WO-2023067610 A1 * | 4/2023 | | H04L 41/0893 |
| WO | WO-2023187678 A1 * | 10/2023 | | |
| WO | WO-2023222248 A1 * | 11/2023 | | G06N 3/086 |

* cited by examiner

*Primary Examiner* — Lan-Huong Truong
(74) *Attorney, Agent, or Firm* — Wang Hardoon, P.C.

(57) ABSTRACT

Methods, apparatus, and systems for dynamic antenna tilt coordination. In one embodiment, real-time data from user equipment (UE) measurement reports are aggregated across multiple base station entities. State input for a machine learning algorithm may be generated from the aggregated UE measurements. The machine learning algorithm may be trained to maximize a real-time network consideration (such as data throughput) by adjusting antenna tilt. During operation, the machine learning algorithm provides tilt settings to each of the radio units (RU) of a base station. Live feedback allows the machine learning algorithm to robustly handle a variety of conditions (e.g., weather, data traffic, etc.)

16 Claims, 10 Drawing Sheets

ANTENNA PATTERN, AZIMUTHAL PERSPECTIVE (θ)

ANTENNA PATTERN, ALTITUDE PERSPECTIVE (φ)

METHODS AND APPARATUS FOR DYNAMIC ANTENNA TILT COORDINATION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of cellular network management. Specifically, the present disclosure is directed to hardware, software, and/or firmware implementations for controlling antenna tilt.

DESCRIPTION OF RELATED TECHNOLOGY

The coverage and capacity of a cellular network can be changed by adjusting the antenna patterns of its cells. For example, changing the "azimuth" and "elevation" of an antenna can be used to concentrate and/or direct antenna radiation in a desired direction (e.g., to increase gain and/or adjust cellular coverage). Historically, cellular networks used mechanical antenna tilts to maximize cellular coverage. More recently, cellular networks have incorporated electrical antenna tilt to allow for remote antenna tilt configuration. Remote antenna tilt configuration can greatly reduce the network operator's operational expenses (OPEX) by minimizing the use of field technicians.

DETAILED DESCRIPTION

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Antennas Radiation Patterns, Antenna Tilt, and Beamforming

Figure 1:
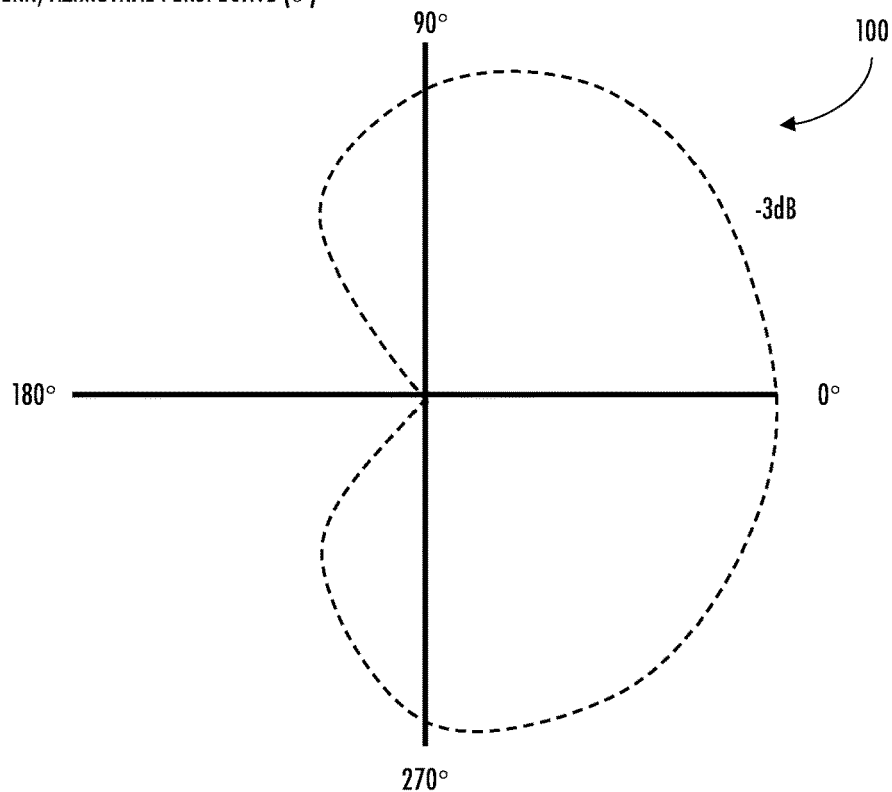
FIG. 1 is a graphical representation of one illustrative antenna pattern in azimuth and elevation useful to explain various aspects of the present disclosure.
Figure 1:
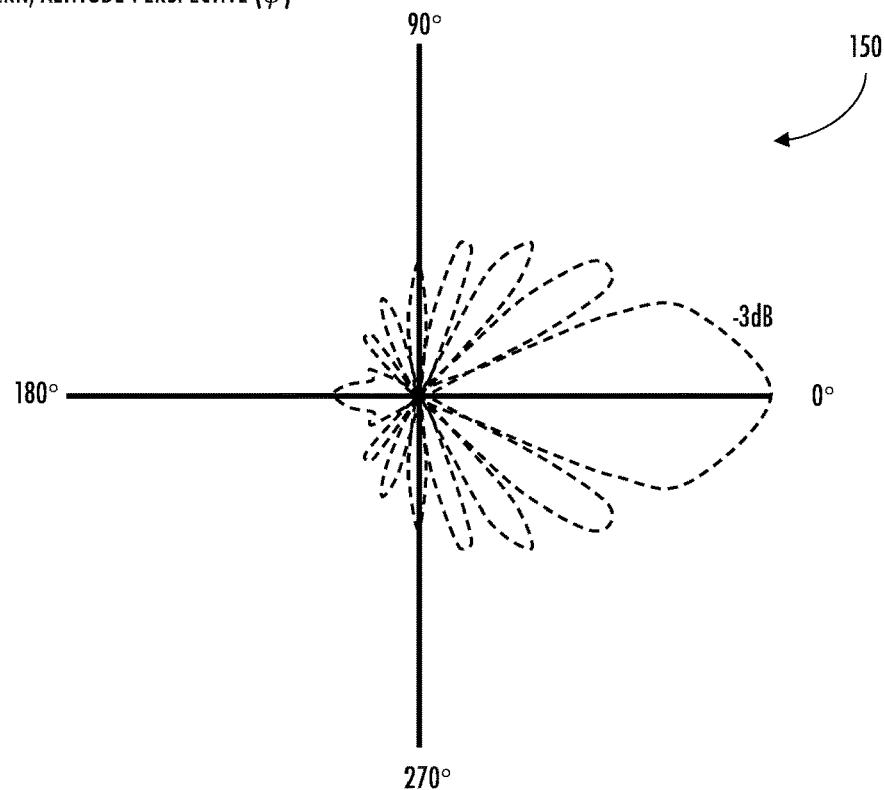

Real-world antennas radiate/receive electromagnetic waves according to an antenna pattern. FIG. 1 provides a graphical representation of one illustrative azimuth (100) and elevation (150) antenna patterns. Antenna radiation/reception may be visualized as a three-dimensional (3D) power density of the transmitted/received signal. Notably, an antenna may have a transmit pattern that matches, or differs from, the receive pattern. As shown, the antenna pattern is depicted in free space (i.e., without obstruction) with "lobes" at a specific attenuation level (−3 decibels (dB)). In some cases, the lobes may be designated as e.g., primary lobe, secondary lobes, tertiary lobes, etc.; other common designations include e.g., main lobe, side lobes, back lobes, etc.

Figure 2:
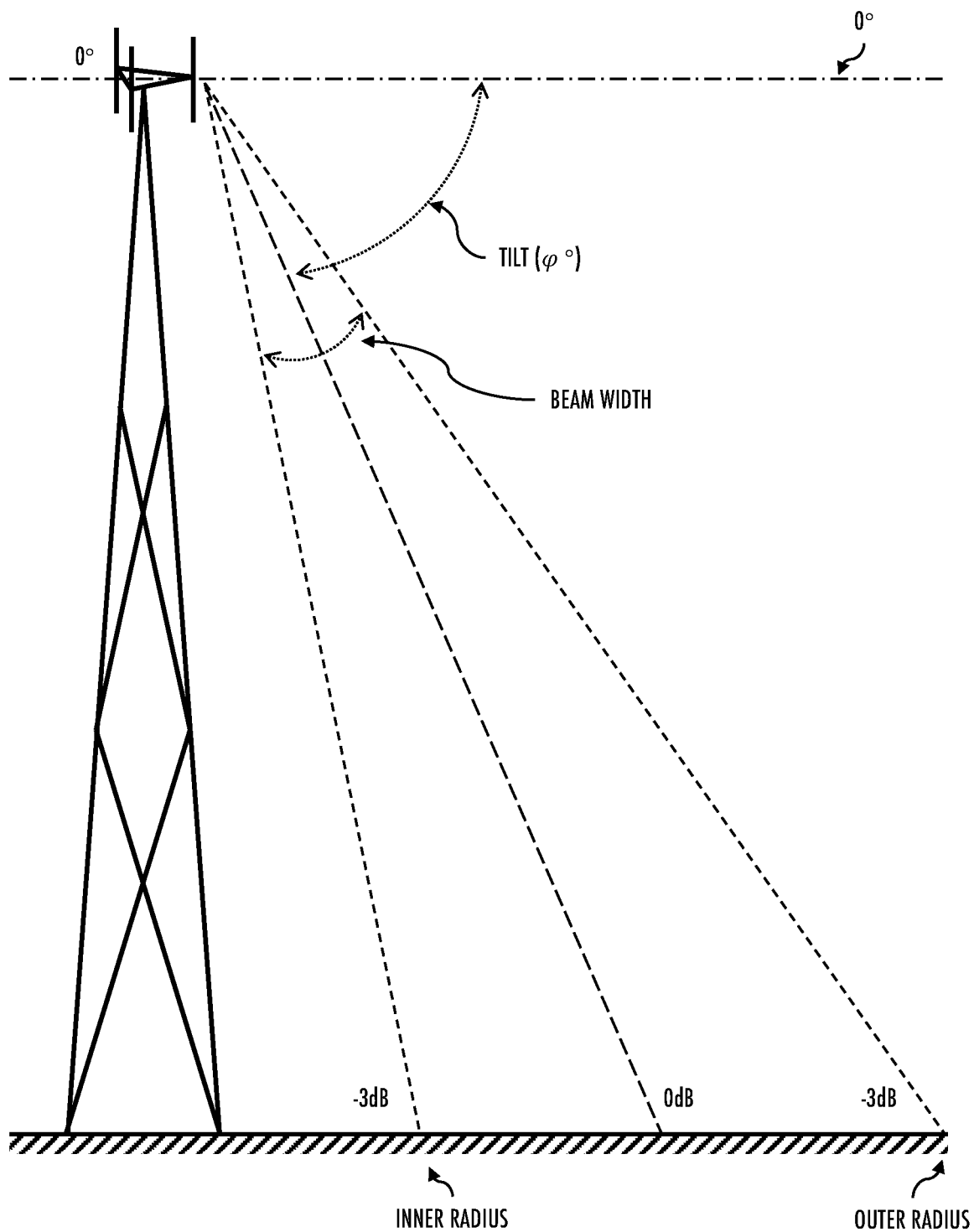
FIG. 2 is a graphical representation of a base station antenna useful to explain various aspects of the present disclosure.

FIG. 2 provides a graphical representation of a base station antenna. "Tilt" refers to the elevation angle of the antenna relative to its axis. As shown, the base station antenna has a "downtilt" to provide terrestrial or maritime coverage; "uptilt" may be used to provide aerial coverage (suitable for drone, aircraft, and/or satellite use). The "coverage footprint" is based on the tilt and beamwidth of the antenna pattern; Relative to the base station antenna, the coverage footprint corresponds to the inner radius, outer radius, and azimuthal range (not shown) of the primary lobe. Changing the tilt (and/or beamwidth) affects the size and signal density of the coverage footprint. Larger footprints may provide a larger coverage area; smaller footprints may offer higher antenna gain.

In the antenna arts, there are two tilt mechanisms that can be applied together or separately: mechanical tilt and electrical tilt. Due to differences in operation, electrical tilt and mechanical tilt often have different behaviors for the same tilt setting.

Mechanical tilt refers to physical tilting of the antenna mechanism relative to the terrain (the signal incidence is the coverage footprint). Since the lobe sizes and orientations are unchanged and relative to the antenna, downtilting the primary lobe may uptilt side and/or back lobes. Additionally, since the antenna pattern has an irregular 3D power density, mechanical tilting can create coverage distortions (e.g., the outer radius, inner radius, and azimuthal range may change erratically).

Electrical tilt refers to techniques that modify the signal characteristics of the transmitted/received signal to change the coverage footprint. Most electrical tilt systems use phase adjustments and constructive/destructive interference to change the size of the primary lobe relative to its other lobes. Typically, electrical tilt changes the inner radius, outer radius, and azimuthal range of the primary lobe uniformly. However, in some extreme cases, electrical tilt can inadvertently increase the secondary or tertiary lobe sizes, which may increase inter-cell interference (ICI) for neighboring cells.

In the past, antenna tilt was manually set by a field technician once during initial set-up with little (if any) subsequent adjustment. For example, the antenna might be installed and mechanically tilted using rudimentary brackets. Most network operators use default tilts for their network cells with minor adjustments for region, cell size, and antennas heights and types. More recently, electrical tilting systems enable remote adjustment of the tilt angle, where the difference in phase between the antenna elements creates the electrical tilt.

Figure 3:
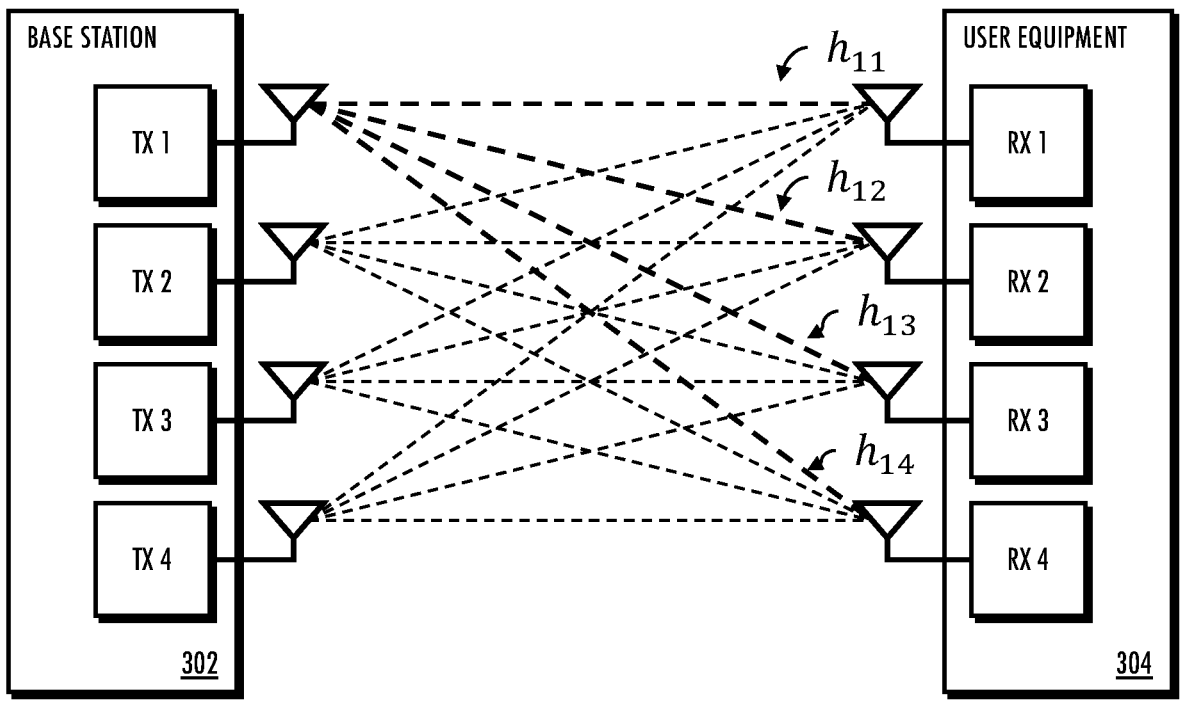
FIG. 3 is a graphical representation of one exemplary multiple-input-multiple-output (MIMO) beamforming system useful to explain various aspects of the present disclosure.

As a related tangent, so-called "antenna beamforming" or "beamforming" refers to wireless technologies that focus a wireless signal between specific transmitters and receivers. FIG. 3 depicts one exemplary multiple-input-multiple-output (MIMO) beamforming system useful to explain various aspects of the present disclosure. While the illustrative example is presented in the context of a 4×4 MIMO system, beamforming techniques are applicable to any order of MIMO, single-input-multiple-output (SIMO), and/or multiple-input-single-output (MISO) system.

In FIG. 3, a base station transmitter 302 uses four (4) transmit antenna elements to transmit a wireless signal (x) via a wireless channel (H) to four (4) receive antenna elements of the user equipment receiver 304; the channel has unknown noise (N). This can be described according to the vector-matrix operation EQN. 1:

$$\begin{bmatrix} y_1 \\ y_2 \\ y_3 \\ y_4 \end{bmatrix} = \begin{bmatrix} x_1 \\ x_2 \\ x_3 \\ x_4 \end{bmatrix} \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{444} \end{bmatrix} + N \quad \text{EQN. 1}$$

Each channel coefficient $h_{tr}$ corresponds to the path between transmit element (t) and receiver element (r); $h_{11}$, $h_{12}$, $h_{13}$, $h_{14}$ are shown to illustrate the naming convention. By adjusting channel coefficient weighting, the MIMO system can introduce constructive interference to improve signal reception at the receiver; conversely, destructive interference can be used to attenuate signal reception.

Figure 4:
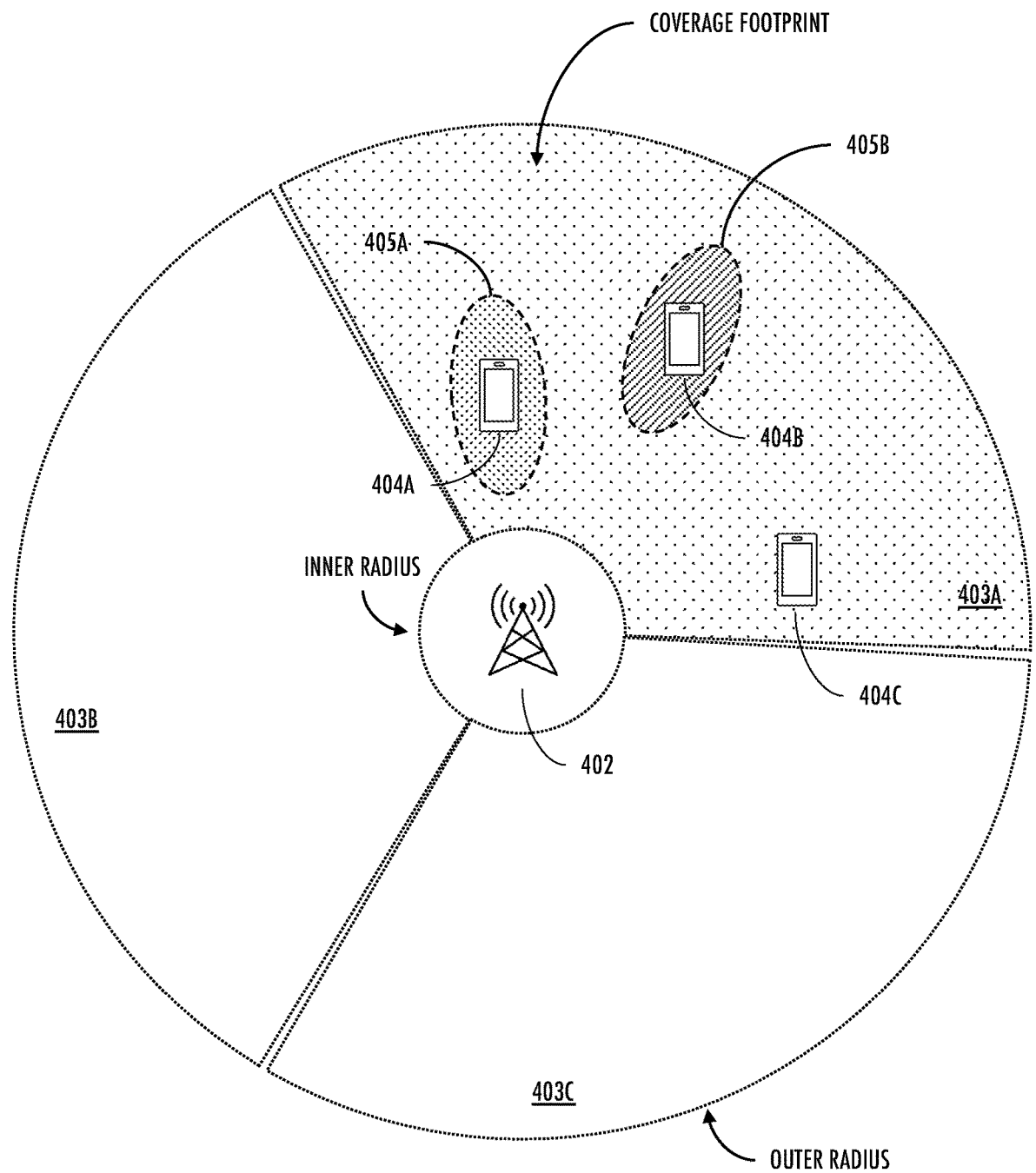
FIG. 4 is a graphical representation that clarifies the distinction between antenna tilt and beamforming useful to explain various aspects of the present disclosure.

FIG. 4 provides a graphical representation that clarifies the distinction between antenna tilt and beamforming. As shown, a base station 402 services three (3) sectors with corresponding coverage footprints (footprint 403A, footprint 403B, footprint 403C). Within footprint 403A, first user equipment 404A actively transmits data via a first beam 405A and a second user equipment 404B actively receives data via a second beam 405B. A third user equipment 404C can passively receive base station control channel transmissions (e.g., physical downlink control channel (PDCCH), etc.) and/or broadcast channels (e.g., physical broadcast channel (PBCH), etc.) Notably, control channel transmissions may quickly fall off outside of the coverage footprint without warning; as a practical matter, the coverage footprint defines the boundary of cell service for the cell sector. More directly, the transmitter-receiver pairwise relationship of beamforming improves point-to-point transmissions, however coverage footprint management (and by extension antenna tilt) remains a distinct and important aspect of network planning. Since coverage footprints can be adversely affected by a variety of unpredictable factors (e.g., rain fade, humidity, unknown interference, etc.), antenna tilt has been conservatively managed.

Network Planning Challenges of 5G Networks

Figure 5:
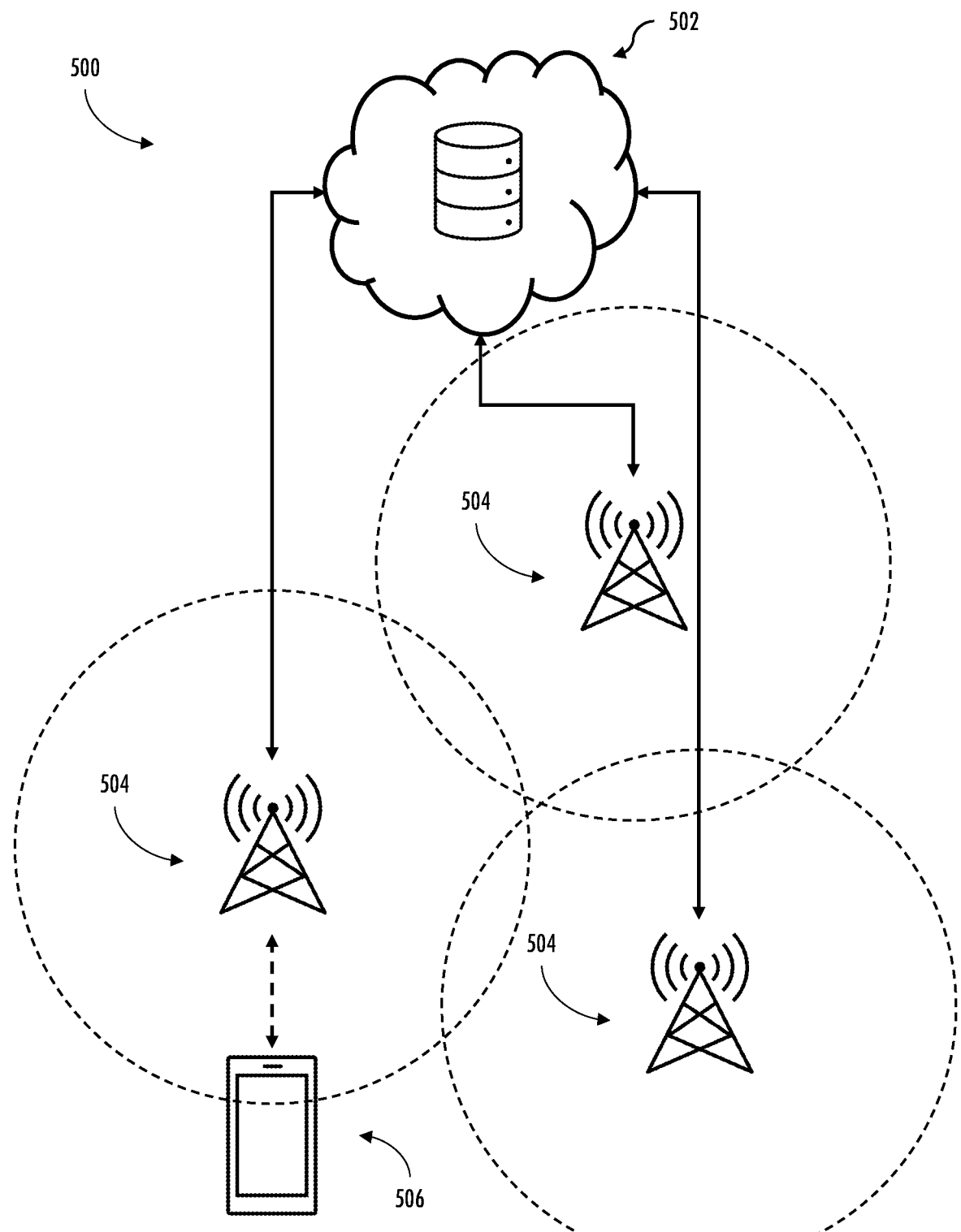
FIG. 5 is a logical block diagram of a homogenous wireless network architecture useful to explain various aspects of the present disclosure.

Cellular networks have been historically designed around homogenous networking assumptions. FIG. 5 is a logical block diagram of a homogenous wireless network architecture 500 useful to explain various aspects of the present disclosure. As shown therein, the cellular network includes a network operator's compute resources 502 that manage a Radio Access Network (RAN) composed of several base stations 504 running a homogenous communication protocol that provides coverage to user equipment 506. For example, a 3G base station could only communicate with 3G cellular devices using a single wireless networking protocol (e.g., UMTS, CDMA2000, etc.)

More recent 4G cellular networking technologies (e.g., LTE, LTE-A) have attempted to support heterogenous networking to varying degrees of success. For instance, the 3rd Generation Partnership Project (3GPP) promulgated a myriad of technical specifications directed to Wi-Fi and LTE interworking. Unfortunately, one of the most difficult problems for optimizing cellular network deployments is interference management. Homogenous networks (e.g., 3G and 4G) make basic assumptions based on geographic RAN deployment; thus, cellular coverage was largely determined by base station density, transmission power, and placement. For example, as shown in FIG. 5, the base stations 504 are deployed to minimize interference.

5G is the first wireless networking technology that is structurally designed to concurrently support multiple different wireless technologies. Incipient 5G networks will support a variety of different applications, each with different usage requirements. Notably, such applications span ultra-low power applications (e.g., Internet-of-Things (IoT)), high-throughput applications (Enhanced Mobile Broadband (eMBB)), low-latency applications (Ultra Reliable Low Latency Communications (URLLC)), and/or machine-only applications (Massive Machine Type Communications (mMTC)). Since many of the usage requirements may require design trade-offs, the 5G technical specifications have mandated that different technologies must work together. For example, so-called "Low-band 5G" is designed to provide 30-250 megabits per second (Mbit/s) over a coverage area and bandwidth (600-850 MHz). So-called "Mid-band 5G" may provide 100-900 Mbit/s using frequency bands (2.5-3.7 GHz); Unlike 4G, 5G supports milli-meter wave (mmWave) bands ("High-band 5G") which may offer extraordinarily fast data rates (multiple Gigabit/s (Gbit/s)) over very short distances. Based on the propagation characteristics of electromagnetic waves in mmWave, the cell coverage may also beamformed using so-called Synchronization Signal Block (SSB) beams. In other words, SSB beamforming techniques are critical to enabling mmWave features for 5G.

Figure 6:
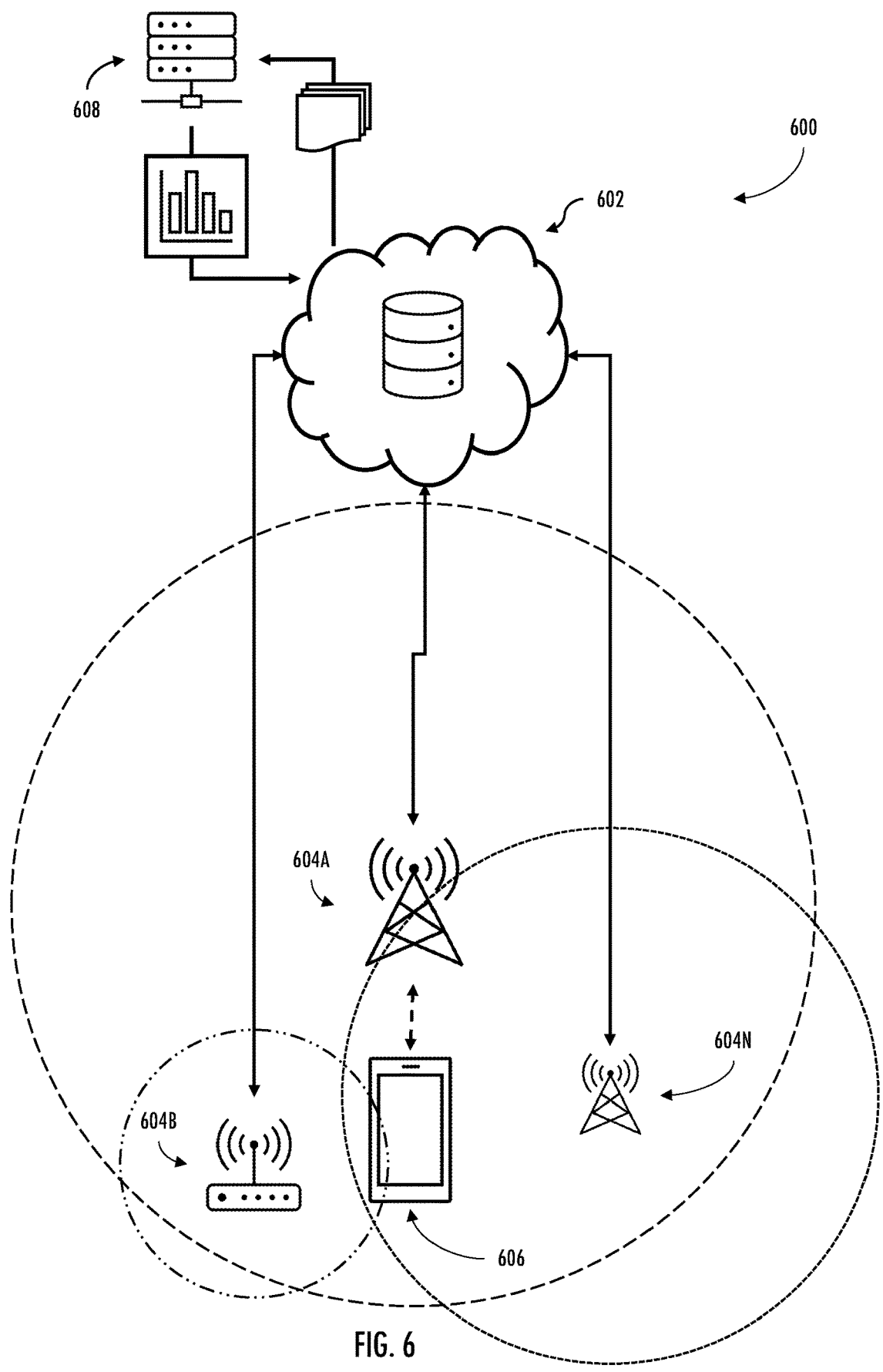
FIG. 6 is a logical block diagram of an exemplary heterogenous wireless network architecture useful to explain various aspects of the present disclosure.

FIG. 6 is a logical block diagram of an exemplary heterogenous wireless network architecture 600 useful to explain various aspects of the present disclosure. As shown, the cellular network includes a network operator's compute resources 602 that manage a diverse set of communication protocols via access nodes 604A, 604B . . . 604N to provide coverage to user equipment 606. Notably, the deployment of access nodes 604A, 604B . . . 604N may be arbitrary and highly fluid. In some cases, access nodes may e.g., shut down when not in use, dynamically adjust coverage based on connectivity and/or bandwidth, etc.

In view of the complex requirements of 5G networks, so-called "Self-Organizing Network" (SON) technology is an important field of research that will enable mature 5G operation. It may not be feasible for a network operator to statically plan for (or manage on a day-to-day basis) the variety of different equipment that is necessary to provide comprehensive 5G service. Consequently, 5G has introduced the concept of a "virtualized network"; in other words, 5G uses software-defined networks (SDNs) to provide the scalability and automation required for future 5G use cases.

Unlike traditional RAN operation, the virtualized network paradigm lets network operators dynamically adjust their networks for specific users and adapt networks based on traffic conditions. SON technology is generally divided into the following functionalities: self-configuration, self-optimization, self-healing, and self-protection. Specifically, self-configuration allows new access nodes to be deployed within existing deployments using automatic network discovery, calibration, and/or configuration. Self-optimization requires that each access node dynamically controls its own operational parameters to maximize its own performance. Self-healing ensures that the overall network handles individual access node failures robustly. Self-protection prevents unauthorized access to the network.

Airhop Communications, Inc. has developed several SON network management suites that provide several layers of Radio Access Network (RAN) optimization to the network operators. The SON network management suites provide various functionalities on-demand. Dynamic network coverage is one area of functionality that has garnered substantial interest among network providers. More directly, these service offerings may be offered at a pricing premium and/or enable features that have substantial market value (e.g., mmWave, etc.) In some cases, this functionality may be charged per-use, pro-rated for usage, provided on subscription basis, or offered at unlimited rates for a feature (or bundle of features).

As previously alluded to, cellular network operators have historically planned network coverage. Quality metrics were often based on call drop rates and geographic coverage. Consequently, antenna tilts were selected to maximize coverage area, and seldom changed. However, virtualized network technologies introduce new paradigms in network planning. For example, coverage area may be dynamically increased or decreased as needed—a single base station may concurrently support multiple different network operators and their corresponding users. Still other interworking technologies (e.g., Wi-Fi and/or satellite) may augment existing cellular coverage. In other words, cellular coverage may dynamically change to accommodate network traffic.

Within this context, new approaches for dynamically adjusting antenna tilt are necessary. While remote antenna tilt technologies exist, these techniques are used for antenna installation and configuration, rather than runtime considerations.

Example Operation

Various aspects of the present disclosure are directed to dynamic antenna tilt coordination. In one embodiment, a base station adjusts its antenna tilt based on the aggregated user equipment reports from its radio units. Some implementations may also consider neighboring base station activity, weather conditions, and/or other historic data (e.g., daily and/or seasonal variations in traffic and/or coverage). In one exemplary embodiment, a machine learning algorithm may be trained to adjust antenna tilt based on the user equipment reports to e.g., maximize data throughput. Specific implementations may additionally coordinate antenna tilts across multiple distributed base station radio units.

Notably, the following discussion combines two separate fields which both use the colloquial term "node" to describe a logical element. For clarity, the term "access node" and its related derivatives in the communication arts (e.g., Node B (NB), evolved Node B (eNB), 5G Node B (gNB), etc.) refer to base station device(s) that provide access to a communication network for user equipment. In contrast, the term "processor node" and its related derivatives in the neural networking arts (e.g., neurons, neural nodes, etc.) refer to processing element(s) that process a task as part of a broader neural network.

Figure 7:
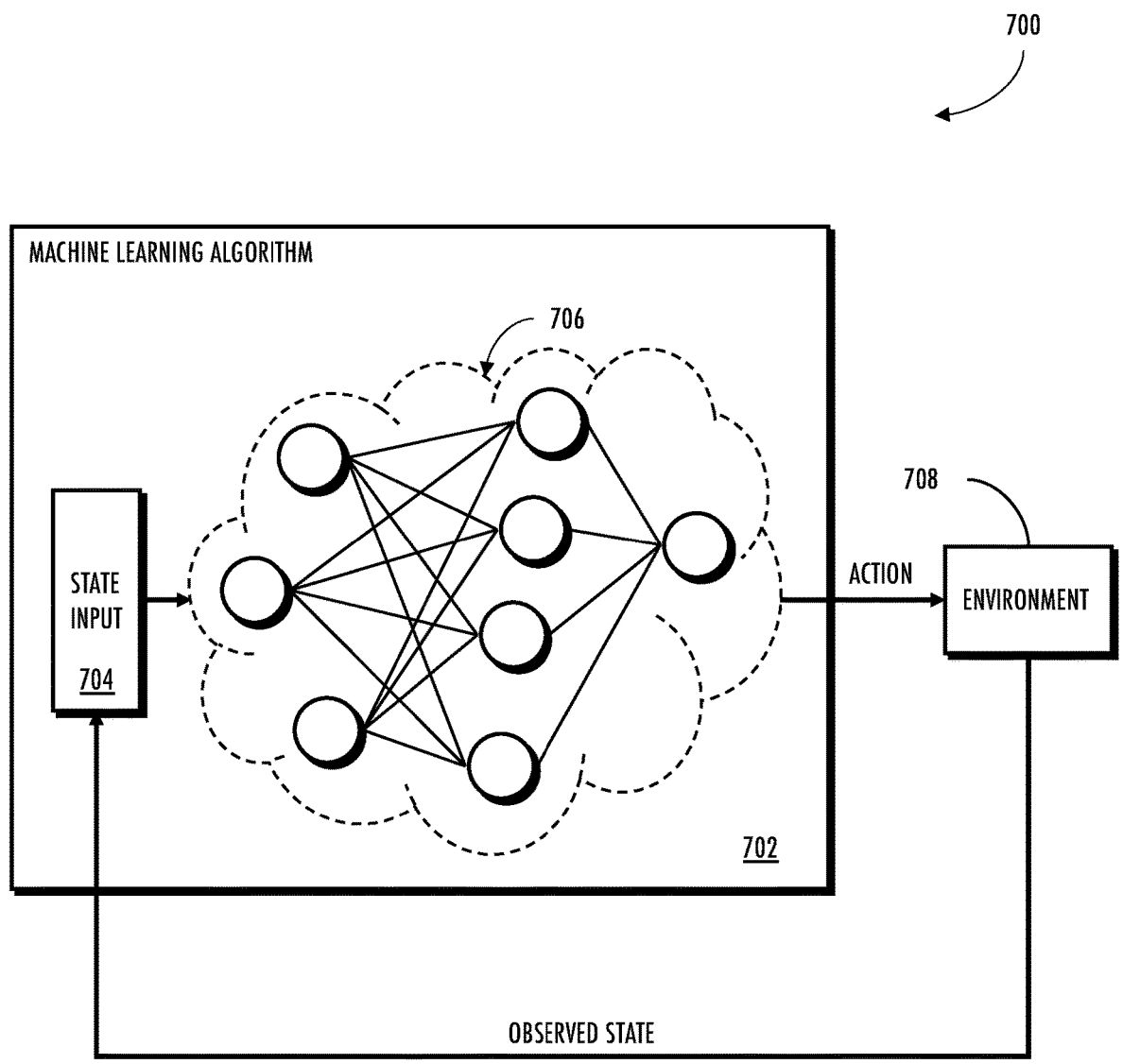
FIG. 7 is a logical block diagram of one machine learning system useful in conjunction with the various aspects of the present disclosure.

FIG. 7 is a logical block diagram of one machine learning system 700 useful in conjunction with the various aspects of the present disclosure.

In one exemplary embodiment, the machine learning algorithm obtains state input 704, and processes the state input with a neural network of processor nodes 706. The neural network of processor nodes 706 generate an action that affects the environment 708. The environment is then observed to provide the next state input. Each processor node of the neural network is a computation unit that may have any number of weighted input connections, and any number of weighted output connections. The inputs are combined according to a transfer function to generate the outputs. In one specific embodiment, each processor node of the neural network combines its inputs with a set of coefficients (weights) that amplify or dampen the constituent components of its input data. The input-weight products are summed and then the sum is passed through a node's activation function, to determine the size and magnitude of the output data. "Activated" neurons (processor nodes) generate output data. The output data may be fed to another neuron (processor node) or result in an action on the environment. Coefficients may be iteratively updated with feedback to amplify inputs that are beneficial, while dampening the inputs that are not.

In one embodiment, the machine learning algorithm 702 emulates each neural network's nodes' processing as an independent thread. A "thread" is the smallest discrete unit of processor utilization that may be scheduled for a core to execute. A thread is characterized by: (i) a set of instructions that is executed by a processor, (ii) a program counter that identifies the current point of execution for the thread, (iii) a stack data structure that temporarily stores thread data, and (iv) registers for storing arguments of opcode execution.

Other implementations may use hardware or dedicated logic to implement processor node logic.

As used herein, the term "emulate" and its linguistic derivatives refers to software processes that reproduce the function of an entity based on a processing description. For example, a processor node of a machine learning algorithm may be emulated with "state inputs", and a "transfer function", that generate an "action."

Conceptually, machine learning algorithms learn a task that is not explicitly described with instructions. In other words, machine learning algorithms seek to create inferences from patterns in data using e.g., statistical models and/or analysis. The inferences may then be used to formulate predicted outputs that can be compared to actual output to generate feedback. Each iteration of inference and feedback is used to improve the underlying statistical models. Since the task is accomplished through dynamic coefficient weighting rather than explicit instructions, machine learning algorithms can change their behavior over time to e.g., improve performance, change tasks, etc.

Typically, machine learning algorithms are "trained" until their predicted outputs match the desired output (to within a threshold similarity). Training may occur "offline" with batches of prepared data or "online" with live data using system pre-processing. Many implementations combine offline and online training to e.g., provide accurate initial performance that adjusts to system-specific considerations over time.

Figure 8A:
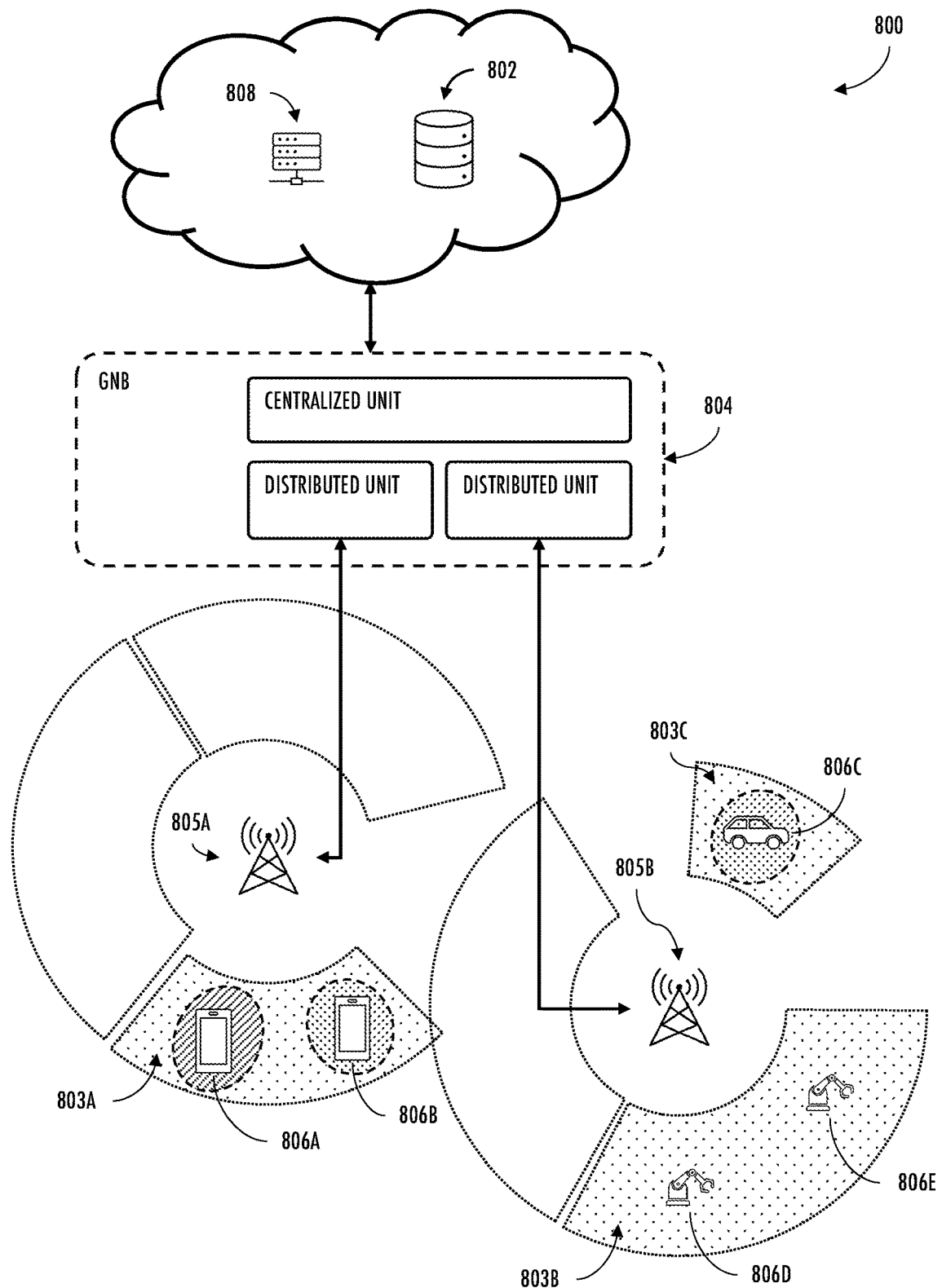
FIGS. 8A-8B are graphical representations of an exemplary system and dynamic tilt scenarios useful to explain various aspects of the present disclosure.

FIG. 8A is a graphical representation of an exemplary system and first scenario Boo, useful to illustrate the dynamic tilt operation. As shown, the base station 804 is connected to the network operator's compute resources 802 and provides coverage to user equipment (806A, 806B, 806C, 806D, 806E). In the exemplary system, the base station may be logically subdivided into a centralized unit (CU), distributed units (DUs) which control multiple radio units (RUs) 805A, 805B.

During operation, each UE provides measurement reports to its serving cell. Measurement reports include a myriad of measured data that is distributed to various layers of the serving cell. For example, 5G base stations typically subdivide access node functionality into various logical layers that are handled at different physical locations. For instance, the UE is attached to a single radio resource connection (RRC) for requesting radio resources from the network; thus, RRC reports may be handled by the centralized unit (CU). Medium access control (MAC) is handled by the DUs—any MAC errors or notifications are sent to the DU (e.g., BER, PER, BLER, etc.) Similarly, physical connectivity may be handled by the individual RU. The UE may provide signal strength and other physical layer feedback to the radio unit (RU) (e.g., RSSI, etc.)

Each RU of the serving cell includes a tilt-capable antenna. For example, a remote electrical tilt (RET) antenna may include multiple antenna elements with configurable phase offsets. Similarly, mechanical embodiments may use motorized brackets for tilting the antenna assembly. In one exemplary embodiment, each RU may have a default antenna tilt; the default antenna tilt may be useful in situations where the antenna experiences relatively little activity or where dynamic antenna tilting is disabled.

In one embodiment, the serving cell aggregates the UE measurements and/or other base station information. In some cases, the serving cell may collect UE measurements from various entities of the networking stack; for example, the CU may provide RRC connection data, the DU may provide MAC data, and the RU may provide RF data, etc.

Examples of UE report data may include, without limitation, real-time UE measurement reports, serving/neighbor cell signal strength, channel quality index (CQI), and/or raw UE throughput. In some variants, the real-time data from other base stations may also be aggregated. Examples may include UE reports for its (the other base station's) connected UEs and/or any other resource allocation/utilization information. Some variants may use time windowing to "batch" relevant metrics within the same interval window; other variants may stream metrics continuously.

As used herein, the term "real-time" refers to tasks that must be/were performed within definitive constraints; for example, a real-time UE measurement report corresponds to UE measurements at a specified time. Due to the highly variable nature of the radio environment, telecommunication networks operate under rigid timing constraints. UE measurement reports are often time sensitive and only reflect network conditions within a specific time window (frame, subframe, slot, etc.)

In one exemplary embodiment, the machine learning logic 808 uses the aggregated measurements as its state input. The machine learning logic 808 is trained (either offline and/or online) to generate output actions for antenna tilt adjustment. The output actions (tilt settings) are transmitted back to the RUs. For example, in an electrical tilt system, the output of the machine learning algorithm may be provided to a corresponding RU to drive the phase offset changes between its antenna elements. Mechanical tilt implementations may use the output to change the orientation of the physical antenna. In the illustrated embodiment, the machine learning logic 808 is implemented via external servers; in other implementations (not shown), the machine learning logic may be geographically localized or even cell-specific. Additionally, while the illustrated machine learning logic 808 is depicted as a single server, the functionality may be distributed across multiple servers with equal success. In some such variants, the servers may be organized according to e.g., geographic region, cell-specific allocations, functional allocations, or any other network organization.

Once the RUs receive the updated tilt settings, the RUs adjust their tilt and observe any resulting changes to the throughput data, or other UE-specific behavior. Any observed changes are measured and reported (UE measurement reports). The UE measurement reports for the connected UEs can be used as the observed state and reward for the next iteration of machine learning processing.

Referring back to scenario Boo, the selected antenna tilts ensure that all UEs lie in a coverage footprint for the current usage. For example, RU 805A supports a transmit beam for UE 806A, and a receive beam for UE 806B; the machine learning logic 808 adaptively sets coverage footprint 803A to optimize their combined data throughput (the total transacted transmit and receive data). Similarly, RU 805B serves a car 806C with a transmit beam; thus, coverage footprint 803C may be tilted to maximize the car's data throughput. Notably, RU 805B also services IOT UEs 806D and 806E via short messaging service (SMS) (a broadcast channel). Since coverage footprint 803B does not have any active beams, it can revert to its default tilt to maximize the coverage footprint area. All other coverage footprints are inactive and may revert to the default tilt setting, or where desired, shut down.

Figure 8B:
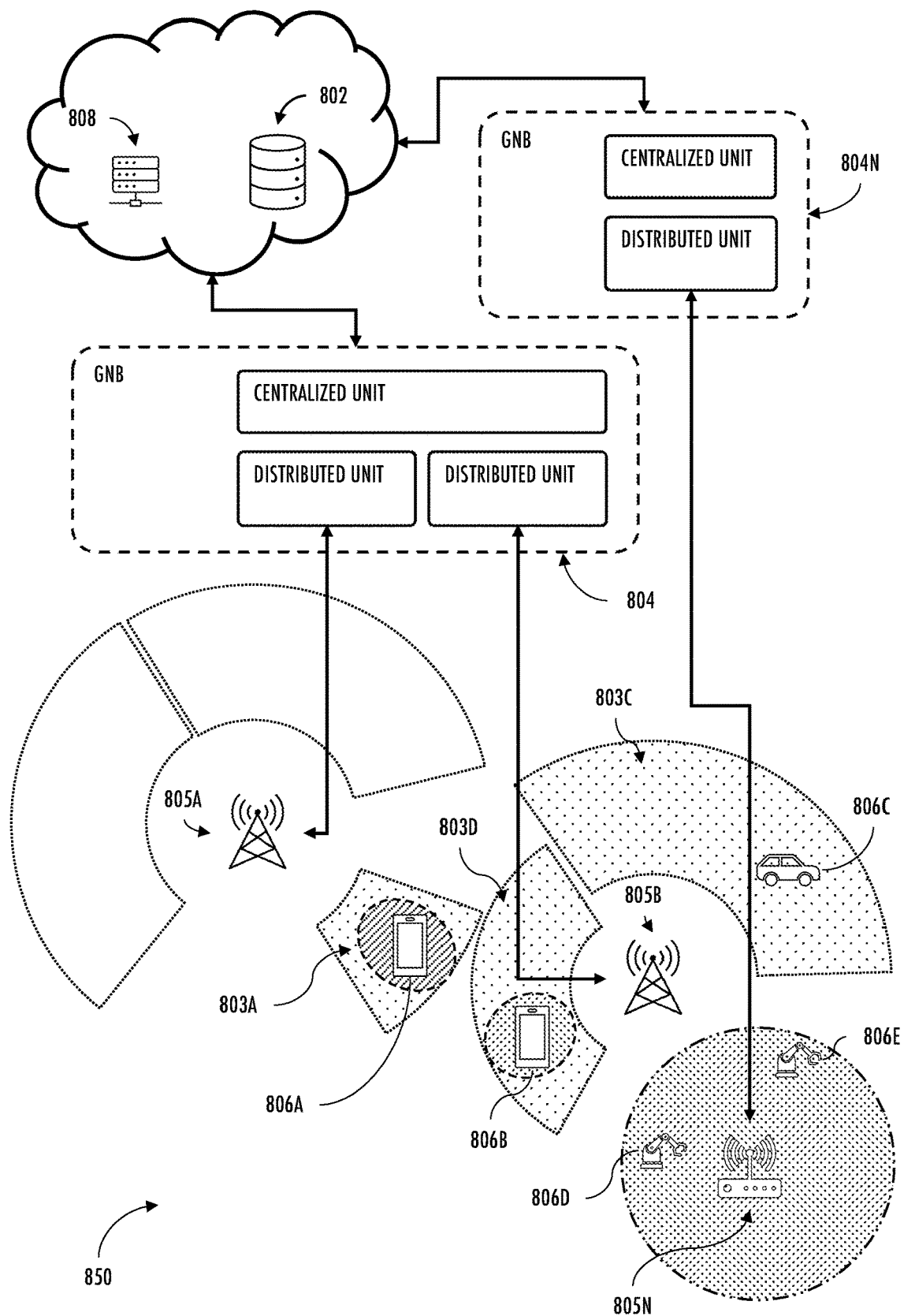

FIG. 8B is a graphical representation of a second scenario 850 for the exemplary system. In the illustrated example, machine learning logic 808 obtains updated user equipment reports from each of the user equipment (806A, 806B, 806C,

806D, 806E) and determines that an updated antenna tilt for each of the RUs (805A, 805B). For example, UE 806A and UE 806B have moved, resulting in new coverage footprint sizes and orientations for 803A and 803D. In this case, the coverage footprints are re-sized to minimize possible inter-cell interference (ICI). Additionally, the car 806C has stopped its data usage, so coverage footprint 803C can revert to its default tilt setting to maximize the coverage footprint area. Finally, UEs 806D and 806E report the presence of a neighboring cell 804N that is being serviced by an RU 805N; consequently, coverage area 803B is disabled to prevent ICI, and both UEs 806D and 806E migrate to the new cell 804N.

As shown in FIGS. 8A and 8B, various aspects of the present disclosure measure cellular performance via UE reports and adjust antenna tilt to achieve desirable performance. The foregoing exemplary scenarios demonstrate trade-offs between coverage area, inter-cell interference (ICI), and data throughput. More generally however, the concepts described herein may be broadly extended to any network that would benefit from dynamic management of coverage. For example, the techniques described herein may be used to reduce power consumption, improve network reliability/performance, minimize operational costs, and/or maximize operating profits.

Methods and Apparatus

Figure 9:
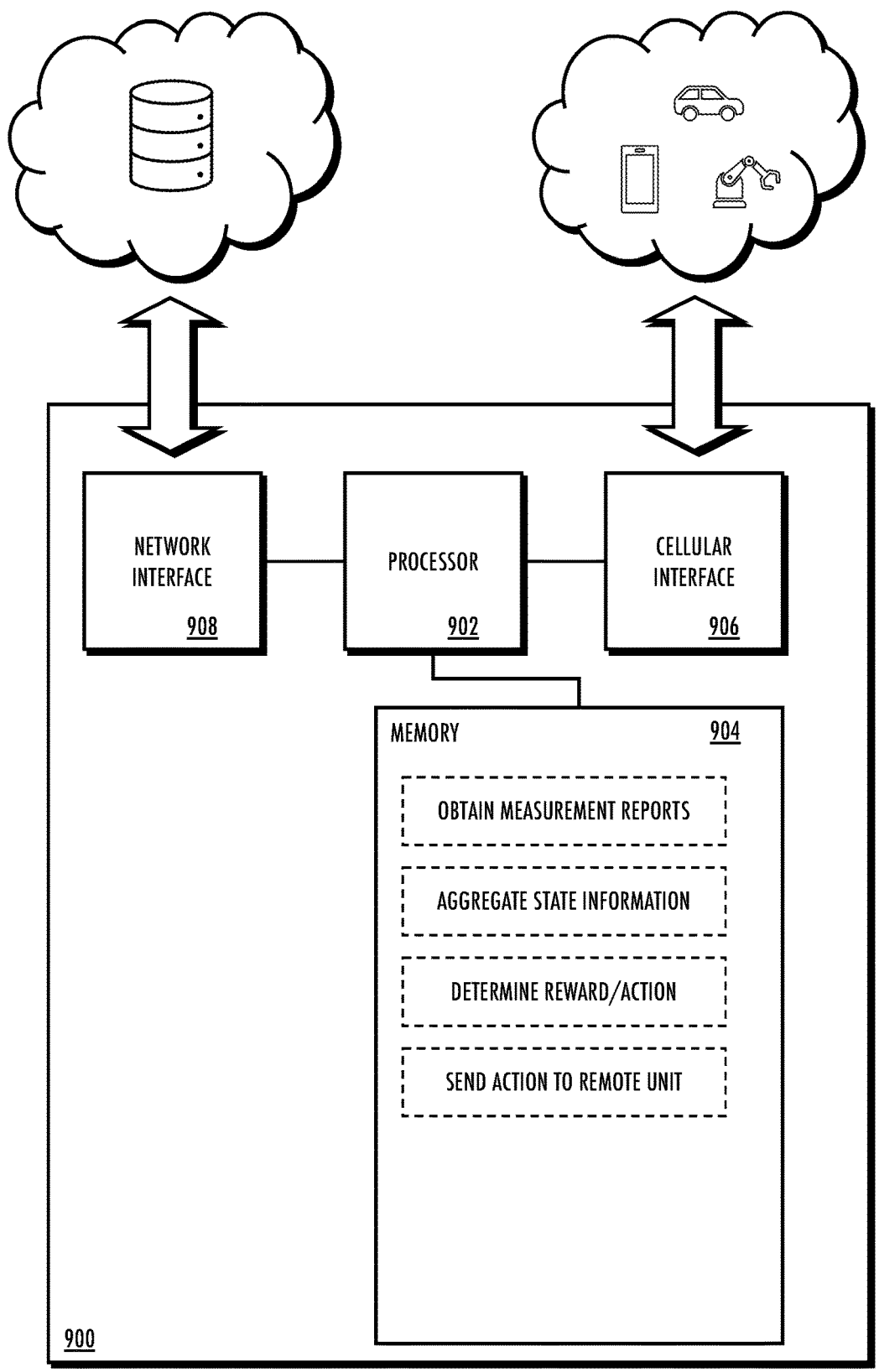
FIG. 9 is a logical block diagram of an apparatus 900 configured to dynamically determine antenna tilt in accordance with various aspects of the present disclosure.

FIG. 9 is a logical block diagram of an apparatus 900 configured to dynamically determine antenna tilt in accordance with various aspects of the present disclosure. In one embodiment, the apparatus 900 includes a processor 902, non-transitory computer-readable medium 904, a user interface 906, and a network interface 908.

The components of the exemplary apparatus 900 are typically provided in a housing, cabinet or the like that is configured in a typical manner for a server or related computing device. It is appreciated that the embodiment of the apparatus 900 shown in FIG. 9 is only one exemplary embodiment of an apparatus 900 for dynamic antenna tilt coordination; other data processing systems that are operative in the manner set forth herein may be substituted with equal success.

The processing circuitry/logic 902 of the server 900 is operative, configured, and/or adapted to operate the server 900 including the features, functionality, characteristics and/or the like as described herein. To this end, the processing circuit 902 is operably connected to all of the elements of the server 900 described below.

The processing circuitry/logic 902 of the server 900 is typically controlled by the program instructions contained within the memory 904. The program instructions 904 include a machine learning algorithm that is trained to dynamically adjust antenna tilt as explained in further detail above. The machine learning application at the server 900 is configured to communicate with and exchange data with other networked entities via its network interface 908. In addition to storing the instructions 904, the memory 904 may also store data for use by the machine learning application. As previously described, the data may include the UE measurement reports and/or any data structures derived therefrom.

The network interfaces of the server 900 allows for communication with any of various devices using various means. In one particular embodiment, the network interface 908 is bifurcated into a first network interface for communicating with other server apparatuses and a second network interface for communicating with user devices. Other implementations may combine these functionalities into a single network interface, the foregoing being purely illustrative.

In one exemplary embodiment, the network interface 908 is a wide area network port that allows for communications with remote computers over the Internet (e.g., external databases). The network interface 908 may further include a local area network port that enables communication with any of various local computers housed in the same or nearby facility. In at least one embodiment, the local area network port is equipped with a Wi-Fi transceiver or other wireless communications device. Accordingly, it will be appreciated that communications with the server 900 may occur via wired communications or via the wireless communications. Communications may be accomplished using any of various known communications protocols.

In one exemplary embodiment, the network interface 908 is a network port that allows for communications with a population of user devices. The network interface 908 may be configured to interface to a variety of different networking technologies consistent with consumer electronics. For example, the network port may communicate with a Wi-Fi network, cellular network, and/or Bluetooth devices.

In one exemplary embodiment, the server 900 is specifically configured to execute a machine learning algorithm that is trained to dynamically adjust antenna tilt. In particular, the illustrated server apparatus 900 stores one or more computer-readable instructions that when executed e.g., obtain UE measurement reports from multiple radio units, aggregate measurement reports across multiple radio units into state information, determine a reward/action based on the state information, and send the action to corresponding radio units to cause adjustments to their corresponding antenna tilts.

Technological Improvements and Other Considerations

The above-described system and method solves a technological problem in industry practice related to dynamic adjustment of coverage footprints. In one specific instance, modern wireless networks are not static and cannot be optimized prior to deployment; the fluid and dynamic nature of different technologies, different usage patterns, and complexity of radio frequency interactions can cause unknown behaviors. The various solutions described herein directly address a problem that was newly introduced by e.g., 5G wireless network deployments. Specifically, previous wireless networks could carefully plan-for or mitigate interference; 5G networks may require cooperation of between different computer data networks of massive scale, having widespread geographic distribution, and unknown radio frequency interactions.

As a related consideration, existing techniques for antenna tilt were based on conservatively maximizing coverage footprints to minimize maintenance personnel requirements (a static consideration). For example, previous wireless networks (3G, 4G) could rely on a relatively fixed radio access network that did not change. Field technicians were only sent out to install and occasionally re-tilt antennas. The various solutions described herein enable dynamic antenna tilt based on ongoing usage data (UE measurement reports), such as those used in 5G cellular networks. In other words, the techniques described herein represent an improvement to the field of network operation.

Furthermore, the above-described system and method improves the functioning of the antenna assembly by robustly and reliably handling data of unknown correlation, quantity, and relevance. As previously alluded to, the coverage footprint can be affected by many different factors (e.g., weather, data traffic, etc.) The above-described system and method specifically adapts to current network conditions that are described within the UE measurement reports. In one specific embodiment, the machine learning algorithm is specifically trained to maximize data throughput (a real-time consideration). In other words, instead of conservatively setting antenna tilt to handle any possible network condition, the solutions described herein enable more aggressive antenna tilts and subsequent recovery (based on feedback). Such techniques are broadly applicable to any radio environment where network planning ahead of time is infeasible and/or unavailable.

Various Other Implementation Considerations

As used herein, the term "computer program" or "software" is meant to include any sequence of human or machine cognizable steps which perform a function. Such program may be rendered in virtually any programming language or environment including, for example, Python, JavaScript, Java, C #/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method for dynamic antenna tilt coordination, comprising:
   obtaining measurement reports corresponding to a plurality of user equipment;
   aggregating the measurement reports into state information;
   determining an antenna tilt for at least a first radio unit of a plurality of radio units based on the state information;
   determining a different antenna tilt for at least a second radio unit of the plurality of radio units based on the state information;
   sending the antenna tilt to at least the first radio unit; and
   sending the different antenna tilt to at least the second radio unit.

2. The method of claim 1, where the measurement reports comprise real-time data measured by the plurality of user equipment.

3. The method of claim 2, where the real-time data comprises a data throughput for at least one user equipment.

4. The method of claim 1, where the measurement reports are obtained from multiple distributed units of a base station.

5. The method of claim 1, where the measurement reports comprise real-time data measured by a plurality of base stations.

6. The method of claim 1, where the antenna tilt is determined via a machine learning algorithm that emulates a neural network of processor nodes.

7. The method of claim 1, further comprising:
   sending a default antenna tilt to at least a third radio unit.

8. A machine learning apparatus, comprising:
   a network interface configured to communicate with a base station and a neighbor base station;
   a processor; and
   a non-transitory computer-readable medium that stores one or more computer-readable instructions that when executed by the processor, cause the machine learning apparatus to:
   obtain measurement reports corresponding to a plurality of user equipment in real-time;
   aggregate the measurement reports into state information;
   emulate a neural network of processor nodes, where the neural network is trained to determine an antenna tilt for at least a first radio unit of the base station based on the state information;
   determine a different antenna tilt for at least a second radio unit of the neighbor base station;
   send the antenna tilt to at least the first radio unit; and
   send the different antenna tilt to at least the second radio unit.

9. The machine learning apparatus of claim 8, where the network interface is configured to communicate with the base station that comprises a centralized unit, at least one distributed unit, and a plurality of radio units.

10. The machine learning apparatus of claim 9, where the one or more computer-readable instructions, when executed by the processor, further cause the machine learning apparatus to:
    obtain a first measurement report from the centralized unit;
    obtain at least one second measurement report from the at least one distributed unit; and
    obtain a plurality of third measurement reports from the plurality of radio units.

11. The machine learning apparatus of claim 8, where the measurement reports are batched according to a time window.

12. The machine learning apparatus of claim 8, where the one or more computer-readable instructions, when executed by the processor, further cause the machine learning apparatus to iteratively update coefficients for at least one processor node based on subsequent measurement reports.

13. A base station, comprising:
a plurality of distributed units, each distributed unit comprising multiple radio units, each radio unit comprising at least one antenna that has a coverage footprint according to an antenna pattern, and a tilting mechanism configured to tilt the antenna pattern;
a processor; and
a non-transitory computer-readable medium that stores one or more computer-readable instructions that when executed by the processor, cause the base station to:
obtain real-time feedback corresponding to a plurality of user equipment;
aggregate the real-time feedback into state information for a neural network of processor nodes;
obtain an antenna tilt for a first antenna of a first radio unit from the neural network of the processor nodes;
obtain a different antenna tilt for a second antenna of a second radio unit;
adjust a first tilting mechanism for the first antenna based on the antenna tilt; and
adjust a second tilting mechanism for the second antenna based on the different antenna tilt.

14. The base station of claim 13, where the one or more computer-readable instructions, when executed by the processor, further cause the base station to:
broadcast control channel information within the coverage footprint.

15. The base station of claim 14, where the one or more computer-readable instructions, when executed by the processor, further cause the base station to generate at least one beam within the coverage footprint, where the at least one beam is associated with at least one user equipment of the plurality of user equipment.

16. The base station of claim 13, where the the first tilting mechanism or the second tilting mechanism comprises an electrical tilting mechanism.

\* \* \* \* \*